United States Patent [19]

Hutchison, IV et al.

[11] Patent Number: 5,953,648
[45] Date of Patent: Sep. 14, 1999

[54] SYSTEM AND METHOD FOR ESTIMATING CLOCK ERROR IN A REMOTE COMMUNICATION DEVICE

[75] Inventors: James A. Hutchison, IV; Robbin D. Hughes, both of San Diego, Calif.

[73] Assignee: Qualcomm Incorporated, San Diego, Calif.

[21] Appl. No.: 08/696,288

[22] Filed: Aug. 13, 1996

[51] Int. Cl.[6] .................................................. H04B 1/16
[52] U.S. Cl. .......................... 455/343; 455/38.3; 455/76; 375/354
[58] Field of Search .............................. 455/343, 68, 69, 455/502–503, 550, 180.3, 13.2, 260, 226.1, 192.1–192.3, 574, 38.3, 75–76, 71; 375/359, 293–294, 226, 354, 363–364

[56] References Cited

U.S. PATENT DOCUMENTS

| | | | |
|---|---|---|---|
| 4,792,963 | 12/1988 | Campanella et al. | 455/13.2 |
| 5,319,679 | 6/1994 | Bagby | 375/354 |
| 5,410,570 | 4/1995 | Ladha et al. | 375/367 |
| 5,416,435 | 5/1995 | Jokinen et al. | 327/113 |
| 5,425,061 | 6/1995 | Laczko, Sr. et al. | 375/371 |
| 5,469,466 | 11/1995 | Chu | 375/354 |
| 5,548,250 | 8/1996 | Fang | 455/260 |
| 5,613,235 | 3/1997 | Kivari et al. | 455/343 |
| 5,661,765 | 8/1997 | Ishizu | 455/260 |
| 5,708,971 | 1/1998 | Dent | 455/38.3 |
| 5,740,129 | 4/1998 | Frampton | 368/10 |

*Primary Examiner*—Vu Le
*Attorney, Agent, or Firm*—Russell B. Miller; Charles D. Brown; Roger W. Martin

[57] ABSTRACT

In a mobile telephone that includes an internal voltage controlled crystal oscillator clock, a clock error compensation system is provided that dynamically determines and compensates for clock error during periods in which the mobile telephone is asleep. The system drives the control voltage of the clock to one of the clock's voltage limits, at which limit the sleep error of the clock can be expected to occur. This expected sleep error is then added to the number of clocking pulses which, in the absence of any clock error, would correspond to the length of the desired sleep period, to generate a corrected internal time. At the end of the sleep period as determined by the corrected internal time, the mobile telephone reacquires a system timing signal that represents actual system time, and the corrected internal time is then compared to the system time. The difference between corrected internal time and actual system time is added to the expected sleep error for the next sleep cycle, with succeeding sleep cycles being progressively longer as the expected sleep error of the clock is recursively determined and applied to the output of the internal clock.

13 Claims, 2 Drawing Sheets

SYSTEM AND METHOD FOR ESTIMATING CLOCK ERROR IN A REMOTE COMMUNICATION DEVICE

BACKGROUND OF THE INVENTION

I. Field of the Invention

The present invention relates to wireless communication systems. More particularly, the present invention relates to a novel and improved system and method for estimating, and correcting for, clock error in a remote communication device.

II. Description of the Related Art

To increase system capacity, some mobile telephone systems use so-called "slotted paging", which relies on what might be thought of as temporal multiplexing of one or more paging channels. In other words, a mobile telephone, in a slotted paging environment, is assigned periodic windows (referred to as "slots") during which the mobile telephone may be paged, with the periods between the windows being reserved for paging other mobile telephones via the same paging channel. Slotted paging is described in more detail in, for example, Telecommunications Industry Association (TIA)/Electronic Industries Association (EIA) Interim Standard IS-95 entitled "Mobile Station—Base Station Compatibility Standard for Dual-Mode Wideband Spread Spectrum Cellular System."

To advantageously conserve battery power, the mobile telephone ordinarily is "powered down" between slots. By "powered down" is meant that most, but not all, of the electrical components of the mobile telephone are de-energized. When powered down, the mobile telephone is referred to as being "asleep".

One component of the mobile telephone that remains energized while the telephone is asleep is the telephone's internal clock, typically a voltage controlled temperature controlled crystal oscillator (VCTCXO). Among other functions, the internal clock meters the sleep period so that the remaining components of the telephone can be re-energized at the correct time to maintain synchronization with the paging channel and monitor for pages during the next successive slot.

It is important that the internal time of the mobile telephone is synchronized with the mobile telephone system time. This is particularly so in systems that use code division multiple access (CDMA) principles to discriminate one mobile telephone signal from another. Accordingly, during its slots in which the mobile telephone is in contact with a system base station, the base station transmits system time to the mobile telephone to facilitate synchronization.

During its sleep periods, however, the mobile telephone must rely on its internal clock to maintain time, because the mobile telephone is not in communication with the base station. Unfortunately, all clocks, including VCTCXOs;, are subject to error. For example, in the case of any voltage controlled crystal oscillator, the input voltage can vary despite efforts to maintain it at a constant operating voltage, and even small input voltage variations introduce time keeping errors. Consequently, in the case of mobile telephones, the internal clock time might not be the same as the system time when the mobile telephone "awakens", thereby undesirably delaying acquisition by the mobile telephone of the paging channel.

This error problem is complicated by the fact that the output characteristics of a VCTCXO change with temperature and with the age of the VCTCXO. As recognized herein, however, it is possible to dynamically compensate for the error of a VCTCXO in a mobile telephone, thereby promoting relatively rapid synchronization with system time when the mobile telephone "awakens".

Accordingly, it is an object of the present invention to provide a system for compensating for internal clock error during periods in which an associated mobile telephone is asleep. Another object of the present invention is to provide a system for compensating for internal clock error in a mobile telephone which dynamically determines the amount of error compensation required. Still another object of the present invention is to provide a system for compensating for internal clock error in a mobile telephone that is easy to use and cost-effective to manufacture and implement.

SUMMARY OF THE INVENTION

The present invention is a novel and improved system and method for estimating, and correcting for, clock error in a remote communication device. Although the invention will be disclosed with reference to an exemplary mobile telephone for purposes of clarity and simplicity, it should be noted that the present invention is applicable to all types of remote communication devices employing an internal clock. These may include, for example, wireless local loop phones, cellular telephones, Personal Communication Services (PCS) phones, and the like. Furthermore, it should be noted that the present invention is applicable to all types of voltage controlled clocks, whether or not crystal based, and whether or not temperature compensated. However, for simplicity and consistency, the present invention will be disclosed with reference to an exemplary VCTCXO.

A method is disclosed for modifying the internal clock time of a mobile telephone to correct for clock error that can arise when the telephone is "asleep" between time slots in a slotted paging environment and thus not in communication with a system timing signal from a base station. Unless corrected for, such clock error can undesirably delay reacquisition of the paging channel when the mobile telephone "awakens" during its next assigned slot.

As disclosed in detail below, the mobile telephone includes an internal voltage controlled clock that is characterized by an operating voltage and a rail voltage. The clock generates a sequence of output clocking pulses at a rate that is proportional to its input voltage, and the method includes receiving a desired sleep period which corresponds to a first number of clocking pulses at the operating voltage. The method further includes defining an expected sleep error, i.e., a rail error, which corresponds to the difference between the number of clocking pulses which are generated at the rail voltage, and the number of clocking pulses which would be generated at the nominal operating voltage. Additionally, the method includes inputting the rail voltage to the clock when the telephone is asleep, and adding the expected sleep error to the first number of clocking pulses to generate a corrected internal time for determining the elapse of the desired sleep period.

In a preferred embodiment, the method further includes inputting the operating voltage to the clock in accordance with the corrected internal time. Stated differently, the method includes powering up the telephone and inputting the operating voltage to the clock when the sleep period elapses, as defined by the corrected internal time.

Still further, the preferred method includes providing a system time, and determining a difference between the system time and the corrected internal time. Then, the method modifies the expected sleep error in accordance with the difference. Moreover, the method includes recursively re-determining the expected sleep error by incrementally increasing the sleep period and repeating the above steps. A computer logic device is also disclosed which implements the above method steps. Indeed, a digital processing apparatus is disclosed which includes logic means for implementing the above steps.

In another aspect, an apparatus is disclosed for determining an internal time in a mobile telephone in a telephone system defining a system time. The apparatus includes a clock for generating an output signal representative of time in response to an input voltage, with the output signal being characterized by a sequence of clocking pulses. Also, the apparatus includes a sleep period definer for defining a desired sleep period, and the desired sleep period defines a number of clocking pulses. Additionally, an input voltage source controller is associated with the clock for establishing the input voltage to be a rail voltage at the start of the sleep period and for establishing the input voltage to be an operating voltage at the end of the sleep period. In accordance with the present invention, the rail voltage is associated with a expected sleep error during the sleep period. A signal combiner is associated with the clock and the sleep period definer for combining the expected sleep error with a number of clocking pulses to generate a corrected internal time.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
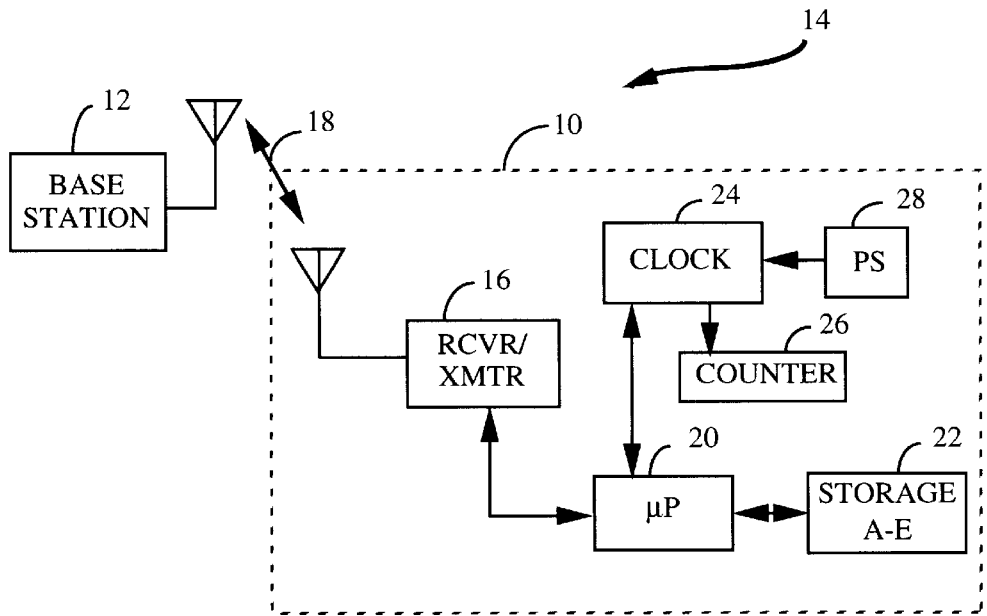
FIG. 1 is a is a schematic view of a mobile telephone in a slotted paging environment.

Referring initially to FIG. 1, a mobile telephone 10 is shown in wireless communication with a base station 12 of a mobile telephone system, generally designated 14. It is to be understood that although a single base station 12 and single mobile telephone 10 are shown in FIG. 1 for clarity of disclosure, the telephone system 14 would typically include other mobile telephones and base stations (not shown). In the presently preferred embodiment, the telephone system 14 implements code division multiple access (CDMA) principles to discriminate one mobile telephone signal from another. It is to be understood, however, that the principles of the present invention apply to other mobile telephone systems (not shown) that implement methods of signal discrimination other than CDMA, i.e., systems that implement frequency multiplexing or time multiplexing.

As shown in FIG. 1, the mobile telephone 10 includes a receiver/transmitter 16 that can communicate with the base station 12 via a wireless link 18. Further, the mobile telephone 10 includes control circuitry for controlling the reception and transmission of data by the receiver/transmitter 16.

In FIG. 1, this control circuitry is rendered, for simplicity, as a digital microprocessor 20. As also shown, the microprocessor 20 can access a data storage device 22. As more fully disclosed below, the data storage device 22 contains instructions that are executable by the microprocessor 20 for undertaking the present invention. Accordingly, with the exception of the logical structure of the data storage device 22, the mobile telephone 10 preferably is a suitable off-the-shelf CDMA mobile telephone.

Additionally, the mobile telephone 10 includes an internal clock 24. In the presently preferred embodiment, the internal clock 24 is a voltage controlled temperature controlled crystal oscillator (VCTCXO). Accordingly, the output signal of the clock 24 is a sequence of clocking pulses that are sent to a counter 26, with the rate of clocking pulse output being controlled by controlling the voltage of an input signal to the clock 24 from a clock power supply 28 in accordance with well-known principles.

Figure 2:
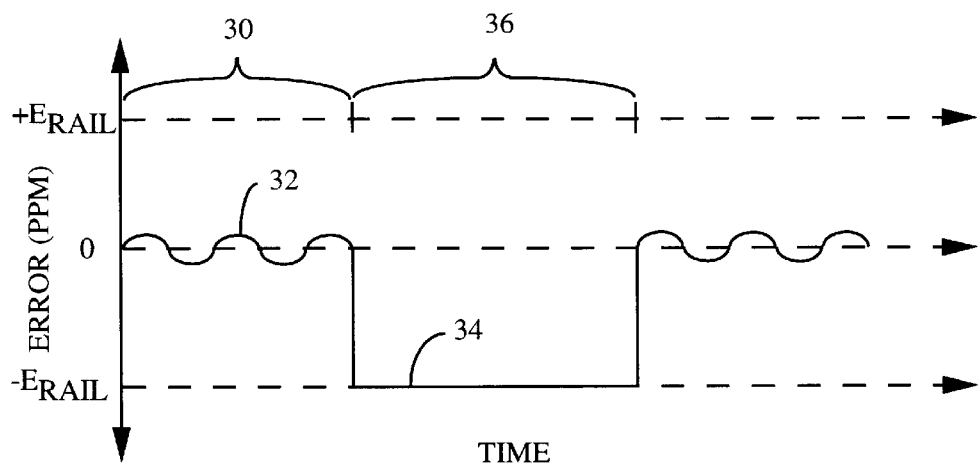
FIG. 2 is a is a graph showing the output of a VCTCXO of a mobile telephone over time, as the control voltage to the clock is varied from the operating voltage to a "rail" (i.e., limit) voltage.

FIG. 2 illustrates the above-mentioned voltage control of the clock 24. As shown in FIG. 2, when a predetermined operating voltage is input to the clock 24 during a first period 30, the clock 24 outputs clocking pulses to the counter 26. As is known in the art, the counter 26 counts the clocking pulses. Because the operating voltage corresponds to a known clocking pulse rate, the number of pulses counted by the counter 26 can be correlated to a time period. For purposes of the present invention, the first period 30 is denoted an "awake" period, because it is intended by the present invention that the operating voltage be input to the clock 24 during periods in which the mobile telephone 10 is "awake", i.e., during periods in which mobile telephone 10 is either actively monitoring the paging channel, or engaged in active communication with base station 18.

As shown in FIG. 2, however, it happens that the rate of the clocking pulses generated by the clock 24 during the first period 30 might not be accurate, but might instead exhibit error as shown by segment 32. This error, which might be caused by small input voltage variations, and/or temperature variations, and/or aging of the clock 24, represent clock error. When the mobile telephone 10 is in time synchronization with the base station 12, FIG. 2 shows that the average clock 24 error is zero, because the base station 12 transmits a timing signal to the telephone 10 that is "tracked" by the telephone 10 to correct its internal clock as appropriate in a feedback loop as is known in the art.

In the absence of an external timing calibration signal, however, as happens when, e.g., the mobile telephone 10 is "asleep" or otherwise not in communication with a base station, it can be appreciated that the internal time of the mobile telephone 10 as indicated by the clock 24 can diverge and thus differ from actual telephone system 14 time. As mentioned above, such a difference undesirably delays the subsequent establishment of a communication link between the mobile telephone 10 and the base station 12, because to establish such a link it is required that the internal time of the mobile telephone 10 be synchronized with actual system time.

As recognized by the present invention and as shown in FIG. 2, it further happens that when the input voltage of the clock 24 is established to be at a high or low limit, colloquially referred to as a "rail", the clock 24 exhibits an expected error rate 34, also referred to as a "rail" error rate, which is relatively constant. FIG. 2 shows such an arrangement at a second period 36. For purposes of the present invention, the second period 36 is denoted a "sleep" period, because it is intended by the present invention that the rail voltage be input to the clock 24 during periods in which the mobile telephone 10 is "asleep", i.e., during periods in which most components of the mobile telephone 10 are de-energized and the telephone is not actively monitoring the paging channel. As more fully disclosed below, the present invention recognizes that the relatively constant rail error rate 34 of the clock 24 can be dynamically recursively determined and advantageously used to promote rapid reacquisition of the base station 12 by the mobile telephone 10.

Figure 3:
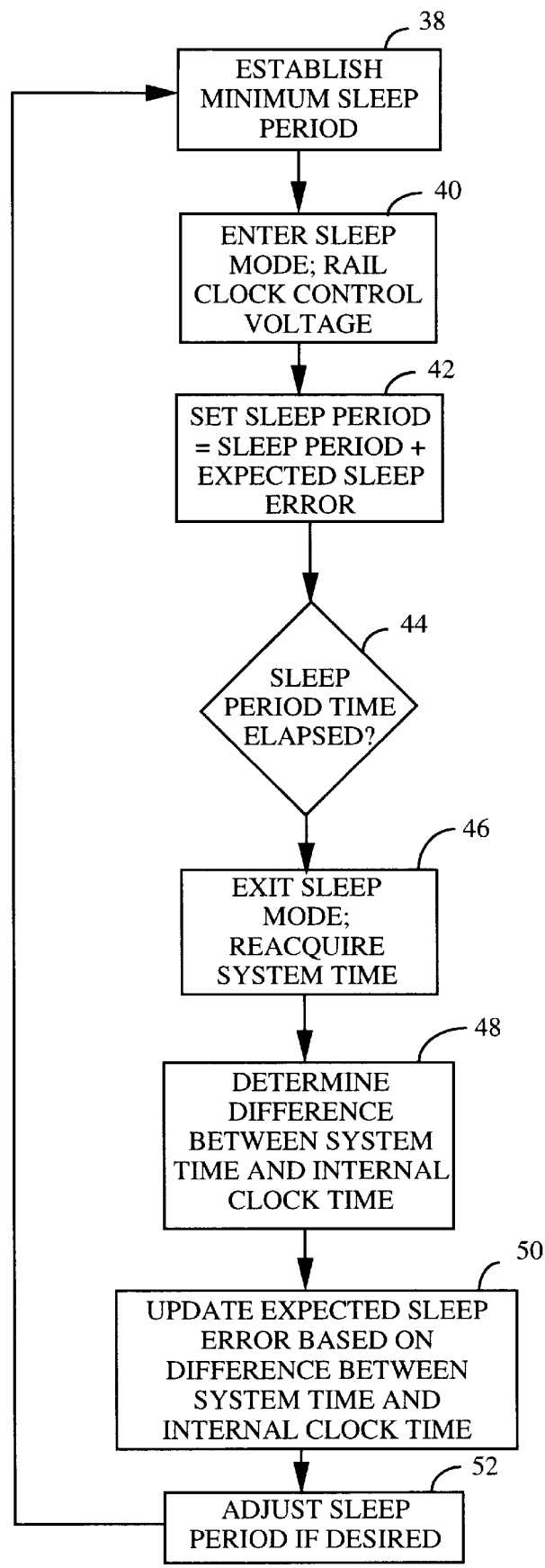
FIG. 3 is a is a flow chart showing the logic of the present invention, as implemented on a control chip of a mobile telephone.

FIG. 3 illustrates the structure of the logic of the present invention as embodied in computer-readable logic structures on the storage device 22 FIG. 1). Those skilled in the art will appreciate that the Figures illustrate the structures of logic elements that function according to this invention. Manifestly, the invention is practiced in one essential embodiment by a machine component that renders the logic elements in a form that instructs a digital processing apparatus (that is, a computer or microprocessor) to perform a sequence of operational steps corresponding to those shown in the Figures.

These instructions may reside in, i.e., be embodied by, logic structures on a data storage device including a data storage medium, such as the storage device 22 shown in FIG. 1. The machine component is shown in FIG. 1 as a combination of logic elements A–E that are embodied in the storage device 22, which advantageously can be electronic read-only memory (ROM) or electronic random access memory (RAM), or other appropriate data storage device. Alternatively, the instructions can be embodied in the form of computer program code elements on semiconductor devices, on magnetic tape, on optical disks, on a DASD array, on magnetic tape, on a conventional hard disk drive, on electronic read-only memory or on electronic random access memory, or other appropriate data storage device.

Now referring to FIG. 3, the logic of the present invention can be understood. Starting at block 38, a desired minimum sleep time period is defined. Thus, at block 38 the mobile telephone 10 is caused to partially power down during a predetermined sleep period, which is a period between assigned time slots of the telephone 10, in accordance with slotted paging principles.

In the presently preferred embodiment, the minimum sleep period is one and twenty eight hundredths of a second (1.28 sec.). In accordance with principles well-known in the art, this sleep period corresponds to a nominal number of clock pulses. For example, when the operating voltage is input to the clock 24, the error-free clocking pulse frequency of the clock 24 is a nominal frequency, e.g., four and ninety-two hundredths Megahertz (4.92 MHz), in which case the nominal number of pulses corresponding to the desired nominal sleep period is (1.28)×(4.92) million pulses.

Proceeding to block 40, at the start of the sleep period the mobile telephone 10 is powered down, with the exception that voltage is still supplied to the clock 24. As indicated in FIG. 3, however, the voltage that is supplied is the rail voltage of the clock 24. Referring briefly back to FIG. 2, when the input voltage to the clock 24 is "railed" at the start of the sleep period, the clock 24 error increases at a constant rail error rate 34, which is a maximum expected error rate. For the first iteration, the nominal rail error rate of the VCTCXO crystal is used as a default value for the rail error rate 34. This rail error rate 34 can be multiplied by the sleep period to render an expected sleep error, expressed as a number of clocking pulses, in accordance with the above discussion.

Accordingly, at block 42, the expected sleep error which accumulates over the sleep period at the rail error rate is added (or subtracted, if negative) to the sleep period. Stated differently, the number of pulses corresponding to the expected sleep error is combined with the number of pulses corresponding to the nominal sleep period, to generate a corrected sleep period and, hence, to effectively establish a corrected internal clock time. While the end of the corrected sleep period occurs at a particular corrected internal clock time, it is to be understood that as used herein "corrected internal time" generally means the current internal time of the clock 24 subsequent to the sleep period.

Next, at decision diamond 44, it is determined whether the corrected sleep period has elapsed. If not, the process enters a loop until the corrected sleep period has elapsed. On the other hand, once the corrected sleep period has elapsed, the process moves to block 46, to power up the telephone 10 and to input the operating voltage to the clock 24. Thus, among other things blocks 40–46 control the input voltage to the clock 24.

Upon power-up and acquisition of the base station 12, the telephone 10 notes the system 14 time as indicated by a timing signal from the base station 12. Next, at block 48, the difference between actual system time and the corrected clock 24 internal time is determined, and then at block 50 the expected sleep error is modified by the difference. In the preferred embodiment, dampening of the successive approximations is provided for stability.

Next, the desired sleep period is increased, if desired, to the next longest sleep period. The process then loops back to block 40. Because the lengths of successively longer sleep periods in slotted paging systems may be different from each other by a multiple of two, the sleep period after block 52 in the first iteration will be 1.28 seconds×2, or 2.56 seconds. It is to be understood in light of the above that the sleep period after block 52 in the second iteration will be 5.12 seconds, and so on, until a maximum desired sleep period is reached. In the presently preferred embodiment, the maximum sleep period is 163.84 seconds. As recognized by the present invention, by incrementally increasing the sleep period as disclosed, and then recursively determining the expected sleep error using ever-longer sleep periods, a highly accurate approximation of the actual rail error rate of the clock 24 for the existing temperature and VCTCXO age conditions can be efficiently determined. Consequently, upon "awakening" in accordance with slotted paging principles, the internal time of the mobile telephone 10 is relatively close to the actual system 14 time, thereby advantageously promoting rapid synchronization between the base station 12 and telephone 10.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for modifying the internal clock time of a mobile telephone including an internal voltage controlled clock characterized by an operating voltage and a rail voltage, the clock generating a sequence of output clocking pulses, comprising the steps of:

(a) receiving a desired sleep period corresponding to a first number of clocking pulses;

(b) defining an expected sleep error corresponding to the rail voltage;

(c) inputting the rail voltage to the clock, the rail voltage being a constant voltage at an input limit voltage of the clock; and (d) adding the expected sleep error to the first number of clocking pulses to generate a corrected internal time.

2. The method of claim 1, further comprising the step of (e) partially powering down the telephone for the sleep period, the inputting step being accomplished at the start of the sleep period.

3. The method of claim 2, further comprising the step of (f) inputting the operating voltage to the clock in accordance with the corrected internal time.

4. The method of claim 3, further comprising the steps of:

(g) providing a system time;

(h) determining a difference between the system time and the corrected internal time; and (i) modifying the expected sleep error in accordance with the difference.

5. The method of claim 4, further comprising the steps of:

(j) increasing the sleep period and the first number of pulses in proportion associated therewith after step (i), and (k) repeating steps (c)–(i).

6. The method of claim 5, further comprising repeating steps (j) and (k).

7. An apparatus for determining an internal time in a mobile telephone in a telephone system, the telephone system defining a system time, the apparatus comprising:

a clock for generating an output signal representative of time in response to an input voltage, the output signal being characterized by a sequence of clocking pulses;

a sleep period definer, coupled to said clock, for defining a desired sleep period, the desired sleep period defining a number of clocking pulses;

an input voltage source controller, coupled to the clock, for establishing the input voltage to be a rail voltage at the start of the sleep period and for establishing the input voltage to be an operating voltage at the end of the sleep period, the rail voltage being a constant voltage at an input limit voltage of the clock, the clock exhibiting an expected sleep error at the rail voltage during the sleep period; and a signal combiner associated with the clock and the sleep period definer for combining the expected sleep error with the number of clocking pulses to generate a corrected internal time.

8. The apparatus of claim 7, wherein the end of the sleep period is determined in accordance with the corrected internal time.

9. The apparatus of claim 7, further comprising a difference determiner for receiving a system time and a corresponding corrected internal time and determining the difference therebetween.

10. The apparatus of claim 9, further comprising a corrector for modifying the expected sleep error in accordance with the difference.

11. The apparatus of claim 10, wherein the sleep period definer doubles the sleep period after the corrector modifies the expected sleep error.

12. A digital processing apparatus comprising:

logic means for defining a desired sleep period of a mobile telephone in a telephone system implementing slotted paging, the desired sleep period defining a number of clocking pulses;

logic means for establishing an input voltage of a clock internal to the mobile telephone to be a rail voltage at the start of the sleep period and for establishing the input voltage to be an operating voltage at the end of the sleep period, the rail voltage being a constant voltage at an input limit voltage of the clock, the clock exhibiting an expected sleep error at the rail voltage during the sleep period; and logic means for combining the expected sleep error with the number of clocking pulses to generate a corrected internal time.

13. The apparatus of claim 12, further comprising:

logic means for receiving a system time and a corrected internal time and determining the difference therebetween; and logic means for modifying the expected sleep error in accordance with the difference.

* * * * *